(12) United States Patent
Fujiwara

(10) Patent No.: US 6,445,836 B1
(45) Date of Patent: *Sep. 3, 2002

(54) IMAGE PROCESSING APPARATUS

(75) Inventor: Tatsuo Fujiwara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,315

(22) Filed: Oct. 29, 1997

(30) Foreign Application Priority Data

Mar. 18, 1997 (JP) ............................................... 9-065119

(51) Int. Cl.[7] .......................... G06G 9/20; H04N 1/04; A47B 97/00; G03G 15/00
(52) U.S. Cl. ..................... 382/312; 358/497; 312/223.1; 399/381
(58) Field of Search ......................... 382/312; 358/474, 358/497, 482, 494; 312/223.1–223.3; 399/108, 110, 380, 381

(56) References Cited

U.S. PATENT DOCUMENTS

| | | | | |
|---|---|---|---|---|
| 4,157,222 A | * | 6/1979 | Ishihara ........................ 355/75 |
| 4,727,387 A | | 2/1988 | Israely ........................ 346/160 |
| 4,740,817 A | | 4/1988 | Suzuki et al. ................... 355/14 |
| 4,888,602 A | | 12/1989 | Watanabe et al. ............ 346/134 |
| 4,928,151 A | | 5/1990 | Saeki ........................... 355/320 |
| 4,934,639 A | * | 6/1990 | Domenig ................. 248/188.4 |
| 5,003,493 A | | 3/1991 | Okada et al. ................ 364/519 |
| 5,106,074 A | | 4/1992 | Nishigaki et al. ........... 271/162 |
| 5,139,252 A | | 8/1992 | Morita et al. ................ 271/117 |
| 5,621,563 A | * | 4/1997 | Brook et al. ................. 358/494 |
| 5,663,812 A | * | 9/1997 | Pan ............................. 358/474 |
| 5,838,493 A | * | 11/1998 | Fyruya ........................ 359/443 |

FOREIGN PATENT DOCUMENTS

| | | | |
|---|---|---|---|
| DE | 40 20 814 A1 | 1/1991 | ........... B65H/29/00 |
| EP | 0 288 241 A2 | 10/1988 | ........... H04N/1/00 |
| EP | 0 621 719 | 10/1994 | ........... H04N/1/12 |
| FR | 2 656 181 | 6/1991 | ........... H04N/1/04 |
| GB | 2 219 281 A | 12/1989 | ........... B65H/29/58 |
| GB | 2 238 758 A | 6/1991 | ........... G03G/15/00 |
| GB | 2 299 802 | 10/1996 | ........... H04N/1/00 |
| JP | 61-126366 | 8/1986 | ........... G07D/9/00 |
| JP | 63-61857 | 4/1988 | ........... H04N/1/00 |
| JP | 63-113373 | 7/1988 | ........... H04N/1/00 |
| JP | 2-10665 | 1/1990 | ........... H04N/1/10 |
| JP | 2-94770 | 4/1990 | ........... H04N/1/00 |
| JP | 2-93865 | 7/1990 | ........... H04N/1/00 |
| JP | 4-24557 | 2/1992 | ........... B65H/31/00 |
| JP | 4-304061 | 10/1992 | ........... H04N/1/00 |
| JP | 05308452 | 11/1993 | ........... H04N/1/00 |
| JP | 5-37684 | 12/1993 | ........... H04N/1/00 |
| JP | 06188575 | 7/1994 | ........... G03G/15/00 |
| JP | 9-58881 | 3/1997 | ........... B65H/1/26 |
| WO | WO 91/07046 | 5/1991 | ........... H04N/1/00 |
| WO | WO 94/09589 | 10/1993 | ........... H04N/1/12 |

OTHER PUBLICATIONS

Office Action of corresponding Japanese application, 9–065119, dated Feb. 12, 2002.

* cited by examiner

Primary Examiner—Wenpeng Chen
(74) Attorney, Agent, or Firm—Armstrong, Westerman & Hattori, LLP.

(57) ABSTRACT

An image processing apparatus includes a box-shaped case having an opening, and an image scanner part which carries out an information input operation and is disposed in the opening so that the image scanner part can be pulled out therefrom.

21 Claims, 18 Drawing Sheets

IMAGE PROCESSING APPARATUS

BACKGROUND OF THE INVENTION

1. Field of the Invention

The present invention generally relates to image processing apparatuses, and more particularly to an image processing apparatus which is suited for reducing space occupied thereby in an office or room.

Recently, it has become possible to process a large amount of data at a high speed due to the improved performance of central processing units (CPUs). As a result, image processing techniques have rapidly improved, and image reading apparatuses for business use and personal use have rapidly become popular due to this progress.

However, office space or room space in general is limited, and the space restrictions are strict particularly at the central parts of the city. For this reason, the large operation space required by the image reading apparatus and the image forming apparatus has become a problem, and it is desirable to make improvements from the point of view of space utilization efficiency.

Conventionally, there are image reading apparatus of an automatic document feed (ADF) type, a flat bed type, and a composite type which is a combination of the ADF and the flat bed type.

2. Description of the Related Art

FIG. 1 shows a flat bed type image reading apparatus which is presently used popularly as an apparatus for personal use. According to this flat bed type image reading apparatus, a document is placed on a document glass 72, and the document is covered by a document holding cover 71. When a switch which is not shown is turned ON, a read head (carrier) 73 moves back and forth to successively read the image of the document on the document glass 72.

According to this apparatus, the space efficiency is poor because the apparatus occupies the space on a desk and the operation efficiency is poor because one document must be set at a time. In addition, it is necessary to set the document and operate the apparatus for each document and the operation region at the front must be open.

FIG. 2 shows a composite type image reading apparatus which is a combination of the ADF type and the flat bed type. This composite type apparatus is popularly used in general. According to this apparatus, when documents are stacked on a hopper part 74, the documents are transported by a transport part 76 and are read by an image reader part 73. The read documents are ejected to a stacker part 75 and successively stacked.

According to this apparatus, a plurality of documents are automatically and consecutively supplied and processed, and the operation is extremely efficient. However, the hopper part 74 and the stacker part 75 respectively project to the top and the side, and a large space is required for the operation region. As a result, the position where the apparatus may be set up becomes restricted, and improvements are desired from this point of view.

FIG. 3 shows an improved composite type apparatus which is a combination of the ADF type and the flat bed type, and the stacker part 75 is provided below the hopper part 74. Hence, a document placed on the hopper part 75 is transported by the transport part 76 and is turned over by an U-shaped sheet guide. The document is read when the document passes above the image reader part 73. The read document is ejected on the stacker part 75 below the hopper part 74 in the turned-over state and stacked.

Accordingly, the problem of requiring a large operation region because of the stacker part 75 which projects from the side of-the image reading apparatus is eliminated. However, as in the case of the flat bed type apparatus, the hopper part 74 exists at the top of the apparatus, and it is impractical to put things on the top of the apparatus because of the need to place the documents thereon.

Therefore the image reading apparatus which is presently used in general has the hopper part 74 and the stacker part 75 which respectively project to the top and the side of the apparatus, and a large operation region is required. For this reason, improvements are required from the point of view of realizing efficient utilization of the office space. In addition, the image reading apparatus also takes up a large space as a system, and it is difficult to set up the apparatus close to the user.

SUMMARY OF THE INVENTION

Accordingly, it is an object of the present invention to provide an image processing apparatus in which efficient utilization of office space can be realized.

The above object of the present invention is achieved by an image processing apparatus comprising a box-shaped case having an opening; and an image scanner part which carries out an information input operation and is disposed in the opening so that the image scanner part can be pulled out therefrom.

According to the invention, since the image scanner part disposed in the opening can be pulled out, the information input operation is carried out in a state where the image scanner part is pulled out from the box-shaped case. A document on which information to be input is recorded is placed on the image scanner part when the information input operation is carried out.

Accordingly, any components for inputting information are not provided at least on top of the image processing apparatus (that is, on top of the box-shaped case) and therefore it is possible to place other objects on top of the apparatus. In addition, it is possible to freely utilize not only the space on top of the apparatus but also the spaces at the front and back and on the right and left sides of the apparatus, because the image scanner part is accommodated in the box-shaped case after the information input operation is finished. Since there is no projection on the side faces of the apparatus for example, the position where the apparatus may be set up becomes less restricted and it is possible to reduce the space occupied by the apparatus in an office and the like.

The above image scanner part may be constructed so that the information input operation can be carried out in a state where the image scanner part is accommodated in the opening.

Hence, the image scanner part need not be pulled out from the box-shaped case when the information input operation is carried out. Accordingly, it is possible to freely utilize the space at the front of the apparatus when the information input operation is carried out. Therefore, it is possible to further reduce the space occupied by the apparatus in an office and the like.

The image processing apparatus may have a document cover for covering a document on which information to be input is recorded.

Hence, it is possible to prevent ambient light from entering the inside of the image scanner part. In addition, the document cover makes it possible to uniformly press the document against the image scanner part so that the information input operation can be carried out with high quality.

The above document cover may be disposed on the image scanner part.

When the image scanner part is accommodated into the box-shaped case, the document cover is simultaneously accommodated into the box-shaped case after the information input operation is finished. Hence it is possible to make the size of the image processing apparatus small after the information input operation is finished.

The above image processing apparatus may be configured so that the opening has a height greater than a height of the image scanner part so that a gap is formed on top of the image scanner part.

Hence, it is possible to carry out the information input operation of a thick document in a state where the image scanner part is accommodated in the box-shaped case.

The above document cover may be disposed in the box-shaped case so that the document cover can be pulled out therefrom.

Hence, the information input operation can be carried out without using the document cover. For example, when the information of a plurality of pages of a thick book is to be input, the document cover may disturb the information input operation because the operator has to push the book against an input surface (a document glass) of the image scanner part. In such a case, by accommodating the document cover in the box-shaped case, it is possible to carry out the information input operation without the disturbance of the document cover. In this way, it is possible to carry out the information input operation in a state where the document cover is pulled out or accommodated in the box-shaped case, depending on the type of the document to be input. As a result, the information input operation can be carried out more easily.

The image processing apparatus may further comprise at least two bending fulcrums formed in the document cover.

Hence, it is possible to bend the document cover along a document so that the document is more completely covered. In addition, in the construction where the document cover can be pulled out from the box-shaped case, there arises a step between the image scanner part and the document cover in a state where the document cover is pulled out, because the positions where the image scanner part and the document cover are pulled out are different. In this case, by bending the document cover which has at least two bending fulcrums formed therein, it is possible to bring the document cover in close contact with the image scanner part.

The image processing apparatus may be configured so that heavy-weight devices among devices which are disposed inside the image scanner part are collectively disposed in a back side thereof with respect to a direction in which the image scanner part is pulled out.

Hence, the center of gravity of the image scanner part can be positioned in the back side. Since the image scanner part is used in a state where it is pulled out from the box-shaped case as described above, the image scanner part is apt to fall forward if the center of gravity thereof is positioned in the front side with respect to the direction in which it is pulled out. The image scanner part is apt to fall forward especially easily when the information input operation is carried out with a document such as a heavy book having been placed on the image scanner part.

Since the heavy devices are disposed in the back side of the image scanner part so that the center of gravity thereof is positioned in the back side, it is possible to restrain the image scanner part from falling forward.

The image processing apparatus may be configured so that heavy-weight devices among devices which are disposed inside the box-shaped case are collectively disposed in a back side thereof with respect to a direction in which the image scanner part is pulled out.

Hence, the center of gravity of the box-shaped case can be positioned in the back side thereof. Therefore, it is possible to restrain the image scanner part from falling forward.

The image processing apparatus may further comprise a support leg provided for supporting the image scanner part so that the image-scanner part is prevented from falling forward in a state where the image scanner part is pulled out.

Hence, the image scanner part can be supported by the support leg when a load is applied thereon in a direction of falling forward. Therefore, it is possible to prevent the image scanner part from falling forward in such a case.

The image processing apparatus may further comprise a roller provided at the end of the support leg.

Hence, the image scanner part can smoothly move on a base (a desk, for example) against which the support leg abuts. Therefore the image scanner part can be smoothly pulled out from and accommodated into the box-shaped case. In addition, it is possible to prevent damage to the base caused by contact with the support leg.

The image processing apparatus may be configured to that the support leg can be accommodated in the image scanner part.

Hence, it is possible to prevent the support leg from being an obstacle to accommodation of the image scanner part into the box-shaped case.

The image processing apparatus may have a length adjustment mechanism for adjusting the length of the support leg.

Hence, it is possible to assure that the support leg abuts against the base by adjusting the length thereof using the length adjustment mechanism in a case where there is a height difference between the positions of the base where the box-shaped case is placed and where the support leg abuts. Therefore, it is possible to prevent the image scanner part from falling forward more securely regardless of the form and condition of the base.

The image processing apparatus may have a clamp mechanism for clamping the support leg at least in a support position where the support leg supports the image scanner part and in an accommodation position where the support leg is positioned when the image scanner part is accommodated in the box-shaped case.

Hence, it is possible to prevent unexpected rotation of the support leg and therefore the image scanner part is securely prevented from falling forward. In addition, by clamping the support leg in its accommodation position, it is possible to prevent the support leg from being an obstacle to accommodation of the image scanner part into the box-shaped case The image processing apparatus may have guide frames provided inside the box-shaped case for guiding movement of the image scanner part and a pair of rail parts disposed on both sides of the image scanner part for engaging the guide frames, one of the pair of rail parts being rotatable with respect to the image scanner part.

Hence, the image scanner part is guided by the guide frames when it is pulled out from and accommodated into the box-shaped case. Therefore, it is possible to achieve smooth movement of the image scanner part.

In addition, one of the pair of rail parts is rotatable with respect to the image scanner part. Therefore, if misalignment of the guide frames occurs when the image scanner part moves, the misalignment can be compensated by the rotation of the rotatable rail part. As a result, it is possible to avoid deformation of the guide frames or rail parts caused by said misalignment, and therefore smooth movement of the image scanner part can be maintained.

Other objects and further features of the present invention will be apparent from the following detailed description when read in conjunction with the accompanying drawings.

DESCRIPTION OF THE PREFERRED EMBODIMENTS

Figure 1:
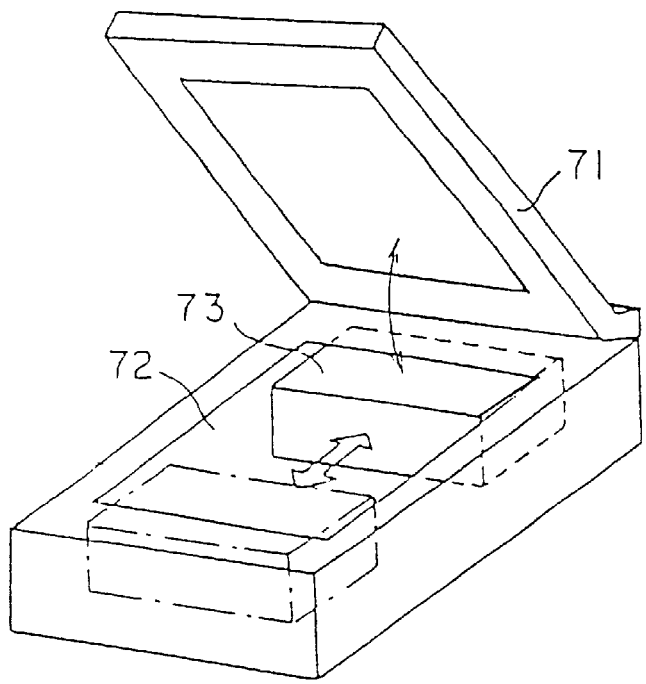
FIG. 1 is a diagram showing an example of a conventional image processing apparatus of a flat bed type.
Figure 2:
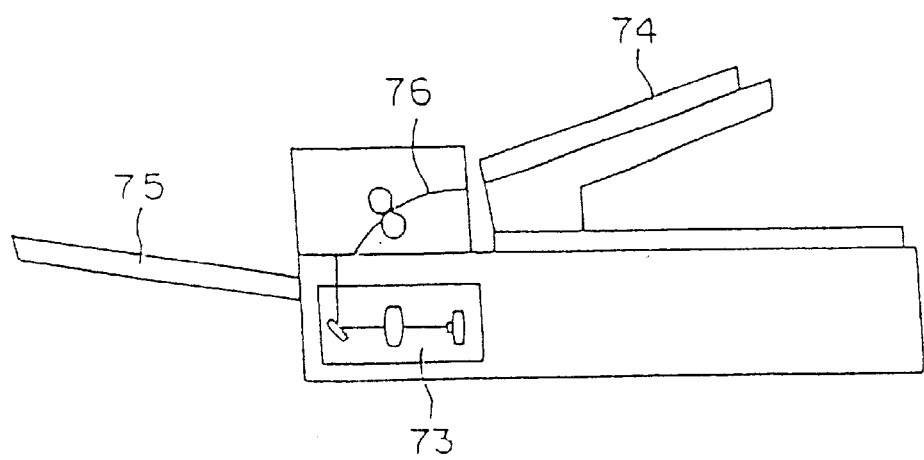
FIG. 2 is a diagram showing an example of a conventional image processing apparatus of an ADF type.
Figure 3:
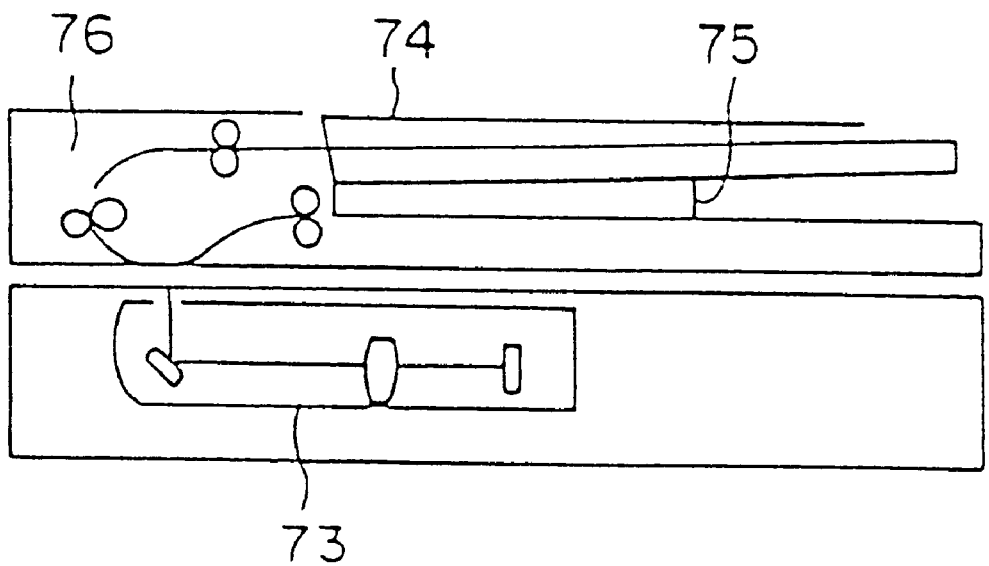
FIG. 3 is a diagram showing another example of a conventional image processing apparatus of an ADF type.
Figure 4A:
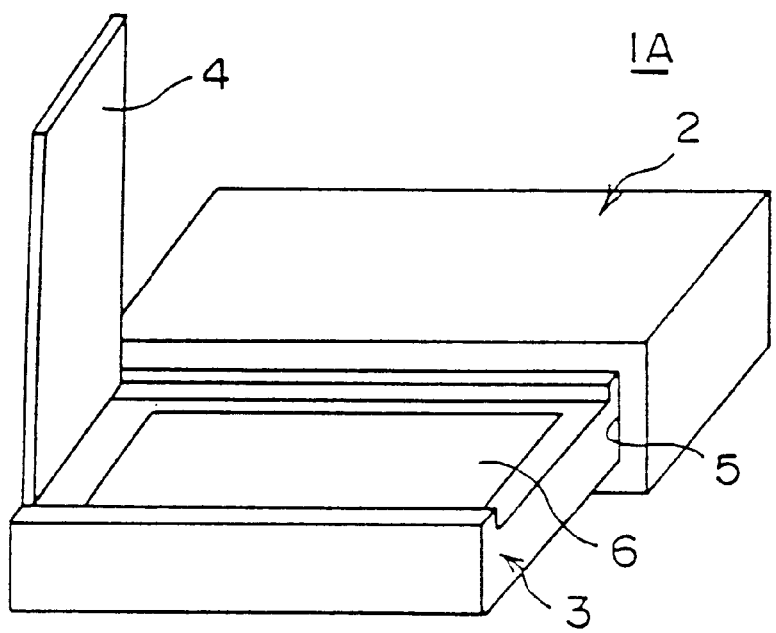
FIG. 4A is a diagram showing an image processing apparatus of a first embodiment of the present invention in a state an image scanner part is pulled out and a document cover is opened.
Figure 4B:
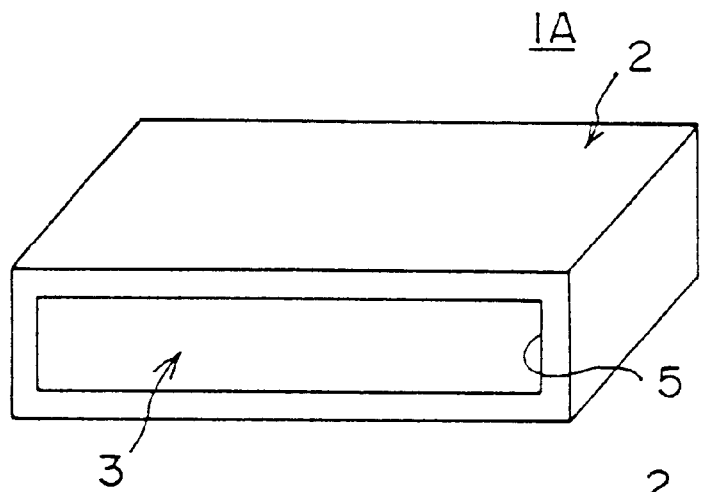
FIG. 4B is a diagram showing the image processing apparatus in a state where the image scanner part is accommodated in a case.
Figure 4C:
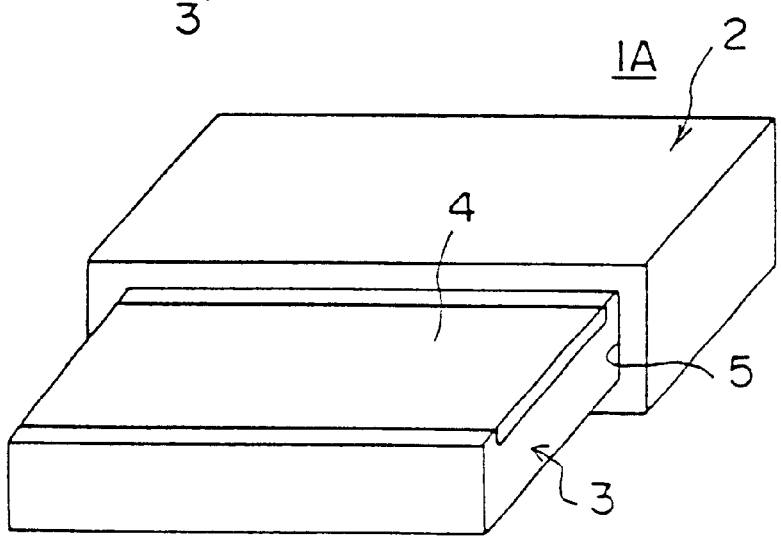
FIG. 4C is a diagram showing the image processing apparatus in a state where the image scanner part is pulled out and the document cover is closed.

FIGS. 4A, 4B, and 4C show an image processing apparatus 1A according to a first embodiment of the present invention. The image processing apparatus 1A shown in FIGS. 4A through 4C is a scanner apparatus which optically reads information from an information recorded medium (referred to as a document hereafter) and supplies the information to a computer. This apparatus 1A generally comprises a box-shaped case 2, an image scanner part 3, and a document cover 4.

FIG. 4A shows a state where the image scanner part 3 is pulled out from the case 2 and the document cover 4 is opened, and FIG. 4B shows a state where the image scanner part 3 is accommodated in the case 2. FIG. 4C shows a state where the image scanner part 3 is pulled out from the case 2 and the document cover 4 is closed.

The case 2 is so constructed that it can accommodate the image scanner part 3. On the front of the case 2, an opening 5 is formed through which the image scanner part 3 is pulled out and accommodated in the case 2. In addition, inside the case 2, various devices and components such as a printed circuit board 18 and a power supply 19 (see FIG. 6), which will be described hereafter, are disposed.

The image scanner part 3 optically reads the information recorded on a document. The image scanner part 3 is of the flat bed type. A document glass 6 is provided on top of the image scanner part 3. An information input operation is carried out after the document has been placed on the document glass 6.

The document cover 4 functions to cover the document which has been placed on the document glass 6. By using this document cover 4, it is possible to prevent ambient light from entering the inside of the image scanner part 3. In addition, the document cover 4 makes it possible to uniformly press the document against the document glass 6 to be in close contact therewith. As a result, the information input operation can be carried out with high quality.

According to the first embodiment of the present invention, the document cover 4 is disposed on the image scanner part 3. By providing the document cover 4 on the image scanner part 3 in this way, when the image scanner part 3 is accommodated into the case 2, the document cover 4 is simultaneously accommodated into the case 2 after the information input operation is finished. Hence it is possible to make the size of the image processing apparatus 1A small after the information input operation is finished (see FIG. 4B).

As described above, in the image processing apparatus 1A according to the first embodiment, the image scanner part 3 is disposed in the opening 5 formed in the case 2 so that the image scanner part 3 can be pulled out. The information input operation is carried out with the image scanner part 3 having been pulled out from the case 2. Because the image scanner part 3 is of the flat bed type, the information input operation is carried out with the document on which the information to be input is recorded having been placed on the image scanner 3, not on the case 2.

Accordingly, any components for inputting information are not provided on top of the image processing apparatus 1A (that is, on top of the case 2) and therefore it is possible to place other components (such as a display device or a printer) on top of the image processing apparatus 1A. In addition, it is possible to freely utilize not only the space on top of the image processing apparatus 1A but also the spaces at the front and back and on the right and left sides of the apparatus, because the image scanner part 3 is accommodated in the case 2 after the input operation is finished. As a result, the position where the apparatus may be set up becomes less restricted and it is possible to reduce the space occupied by the apparatus in an office and the like.

Next, a description will be given of the internal structures of the image scanner part 3 and the case 2 by referring to FIGS. 5A, 5B and 6, respectively.

First, the internal structure of the image scanner part 3 will be described. FIG. 5A is a plane view showing the internal structure of the image scanner part 3, and FIG. 5B is a front view showing the internal structure of the image scanner part 3.

Inside the image scanner part 3, a scanner head 7 is provided for optically reading documents. The scanner head 7 is movably supported at its ends by a guide shaft 16, which is disposed on a back side (the side indicated by an arrow Y1 in the figure) of the image scanner part 3 and a guide rail 17 which is disposed on a front side (the side indicated by an arrow Y2 in the figure) thereof. The scanner head 7 can be moved in directions indicated by arrows X1 and X2 in the figure by an actuation mechanism comprising a belt 13, pulleys 14a, 14b, and a motor 15.

This scanner head 7 accommodates a plurality of mirrors 8a–8d, a CCD 9, a lens 10, an inverter 11, and a light source 12. A light generated by the light source 12 is projected onto the document through the document glass 6, and the reflected light comes into the CCD 9. The reflected light, which includes information of the document, is photoelectrically converted and delivered to external equipment.

Now, the arrangement of each component which constitutes the image scanner part 3 will be described. First, the belt 13, pulleys 14a, 14b, and the motor 15, which constitute the actuation mechanism, and the guide shaft 16 are collectively disposed on the back side (the Y1 side) inside the image scanner part 3. This actuation mechanism is a comparatively heavy structure united on a stay by U-shaped fittings because of the need to tension the belt 13. The guide shaft 16 is a metal shaft which is also heavy. By collectively disposing the heavy actuation mechanism and guide shaft 16 on the back side (the Y1 side) inside the image scanner part 3, it is possible to shift the center of gravity of the image scanner part 3 backward.

Figures 5A, 5B:
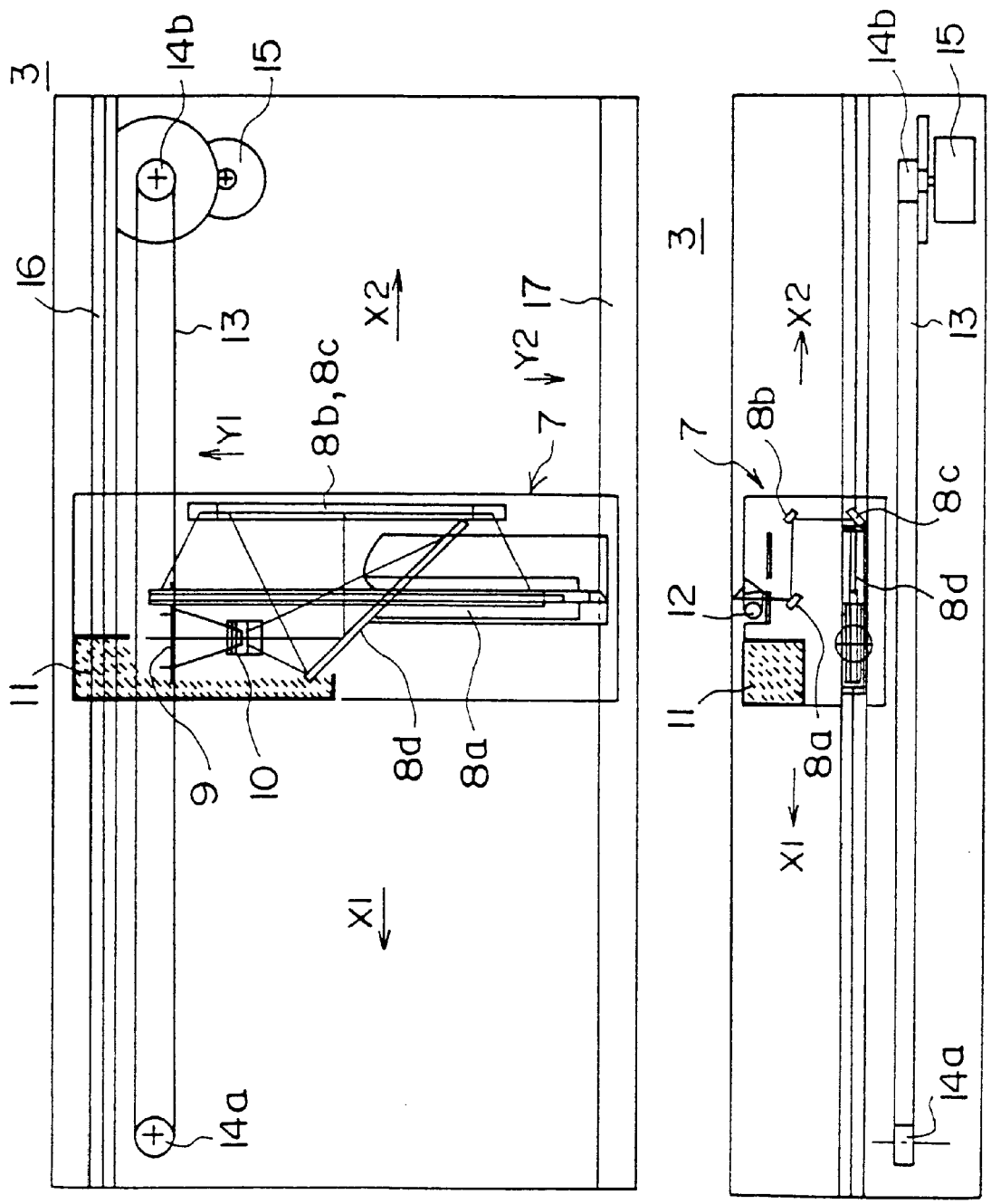
FIG. 5A is a plane view showing an internal structure of an image scanner part provided on the image processing apparatus of the first embodiment of the present invention.
FIG. 5B is a front view showing the internal structure of the image scanner part.
Figure 6:
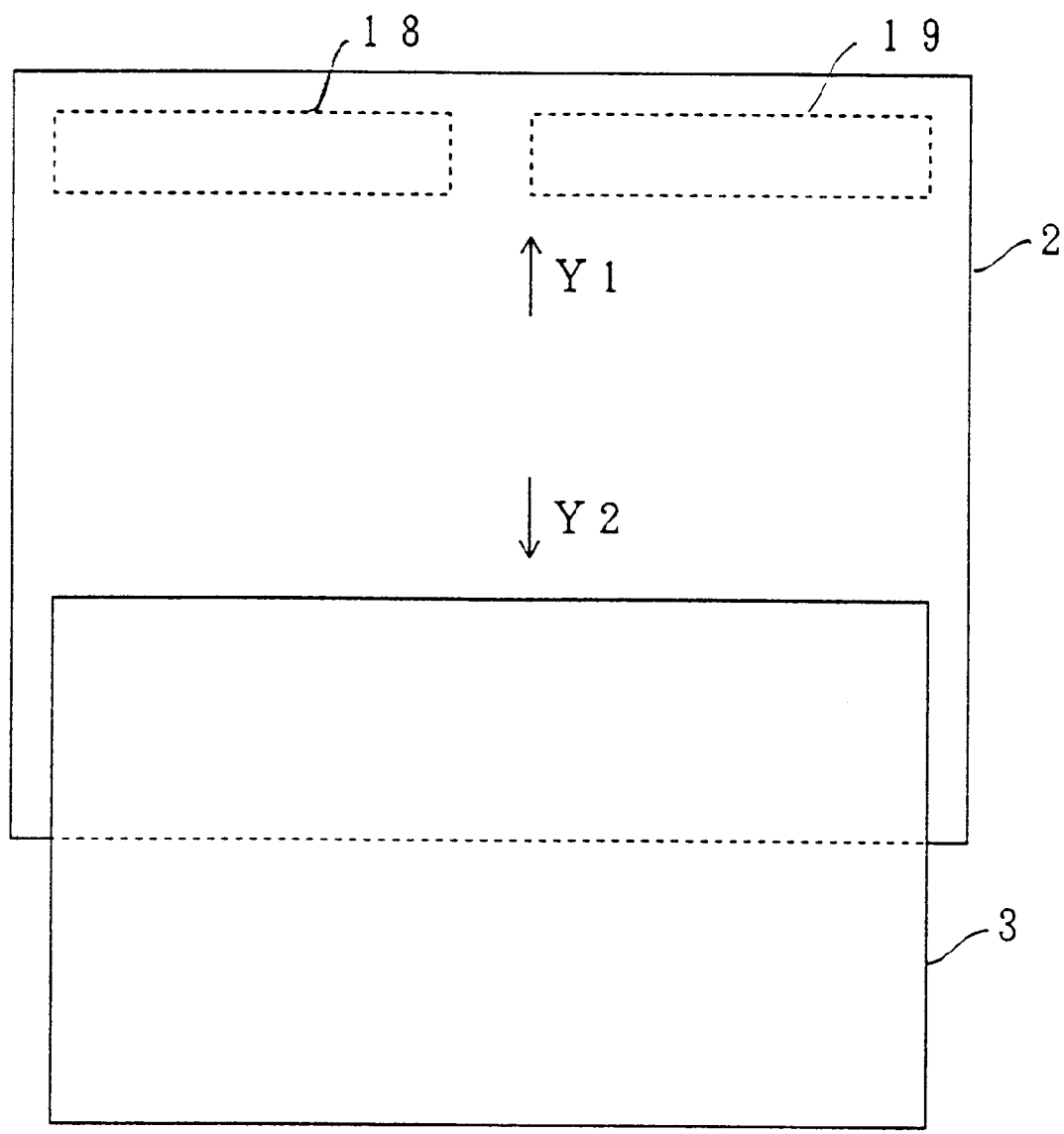
FIG. 6 is a diagram showing an internal structure of a case which is provided in the image processing apparatus of the first embodiment of the present invention.

As shown in FIGS. 5A and 5B, the scanner head 7 comprises a reduction optical system. Contrary to the conventional configuration in which the reflection mirrors 8a–8d in the image forming optical system are arranged parallel to one another, the mirror 8d is inclined about 45 degrees so that the image plane of the optical axis is positioned in the back side of the image scanner part 3 in the first embodiment. The inverter 11, which is disposed on the scanner head 7 and functions to actuate the light source 12 (e.g., fluorescent light), is also a heavy component. The inverter 11 is also positioned in the back side of the scanner head 7. By positioning the center of gravity of the scanner head 7 in the back side as described above, the center of gravity of the image scanner part 3 in which the scanner head 7 is disposed can be shifted backward.

On the other hand, among the components disposed inside the case 2, the printed-circuit board 18 and the power supply 19 are heavy. In the first embodiment of the present invention, the heavy printed circuit board 18 and power supply 19 are collectively disposed on the back side (the Y1 side) so that the center of gravity can be shifted backward. The housing of the image scanner part 3 is a light-weight component formed by molding.

In the image processing apparatus 1A according to the first embodiment of the present invention, a reading operation is carried out in a state where the image scanner part 3 has been pulled out forward from the case 2 and a document has been placed on the image scanner part 3. Some documents such as dictionaries are relatively heavy. In addition, when a document such as a book is placed on the document glass 6, the binding part thereof is raised and therefore the document is pushed down to be in close contact with the document glass 6.

For this reason, according to the structure of the image processing apparatus 1A, the image scanner part 3 is apt to fall forward. The falling can be prevented by increasing the weight of the case 2. However, increasing the weight of the case 2 is against the recent trends of reducing the weight, size, and cost of apparatuses for office automation.

According to the image processing apparatus 1A of the embodiment, by collectively disposing heavy-weight components in the back side of the image processing apparatus 1A with respect to the direction in which the image scanner part 3 is pulled out, it is possible to position both the centers of gravity of the case 2 and the image scanner part 3 in the back side. By positioning both the centers of gravity of the case 2 and the image scanner part 3 in the back side in this way, the center of gravity of the whole image processing apparatus 1A is also positioned in the back side and thereby the apparatus can be restrained from falling forward even in a state where the image scanner part 3 is pulled out.

Figure 7A:
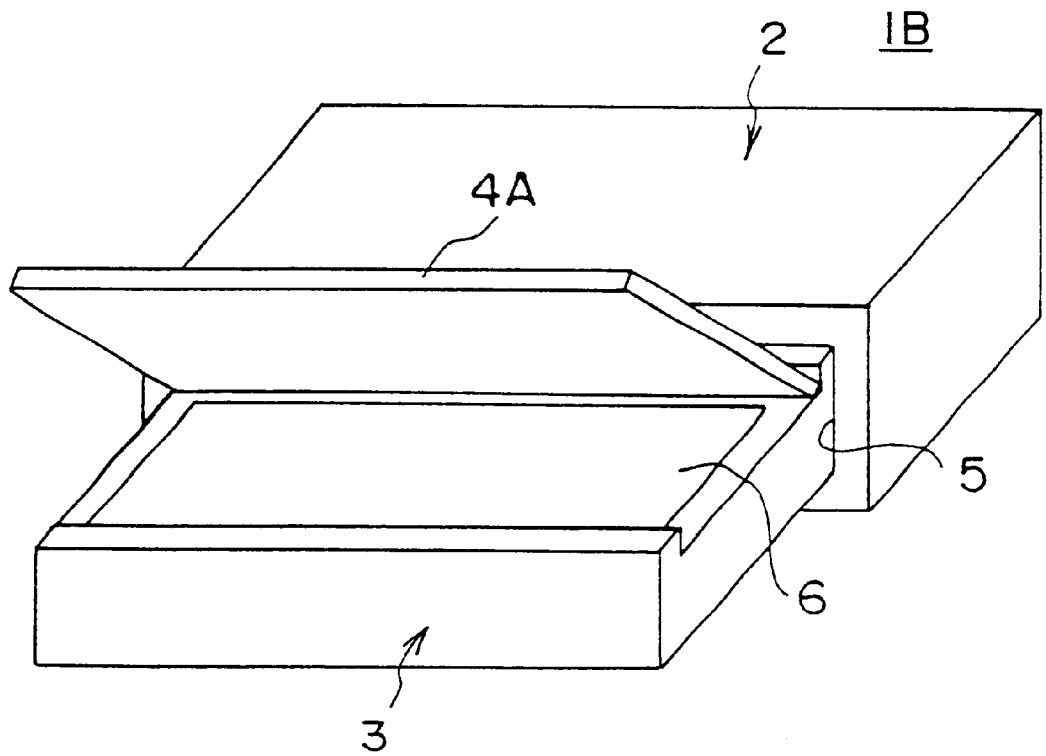
FIG. 7A is a diagram showing a construction of an image processing apparatus of a second embodiment of the present invention where a document cover is pivotable on a back side of the apparatus.
Figure 7B:
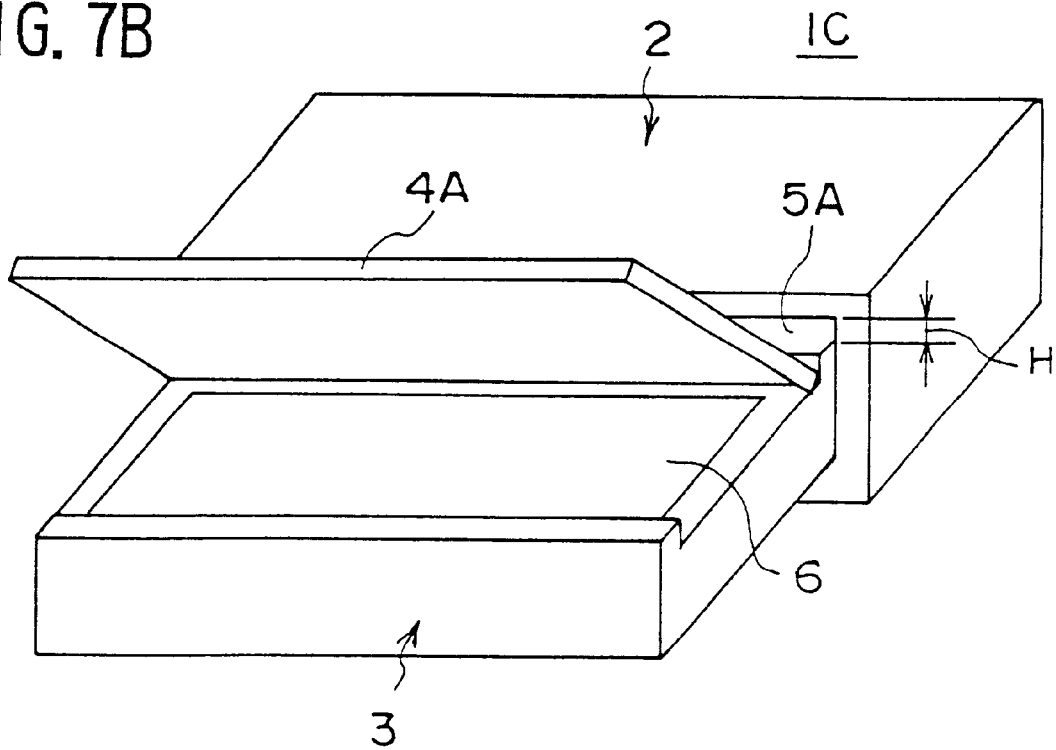
FIG. 7B is a diagram showing a construction of the image processing apparatus of the second embodiment where a height of an opening is larger than a height of a[008e] image scanner part.

Next, a description will be given of a second embodiment of the present invention. Image processing apparatuses 1B, 1C are shown in FIGS. 7A and 7B, respectively. In FIGS. 7A and 7B, and in the following embodiments as well, those parts which are the same as those corresponds parts in the image processing apparatus 1A according to the first embodiment described with reference to FIGS. 4A through 6 are designated by the same reference numerals, and a description thereof will be omitted.

In the image processing apparatuses 1B, 1C shown in FIGS. 7A, 7B respectively, a document cover 4A is provided on the image scanner part 3. Contrary to the image processing apparatus 1A according to the first embodiment where the document cover 4 pivots on the lateral side of the image scanner 3, the document cover 4A pivots on the back side of the image scanner part 3 in the second embodiment.

According to the construction of the second embodiment described above, the document cover 4A can be automatically closed by engagement between the document cover 4A and the top side of the opening 5 when the image scanner part 3 is accommodated into the case 2 with the document cover 4A kept open after the information input operation is finished. Accordingly, it is possible to prevent the document cover 4A from striking against the case 2.

In the image processing apparatus 1B shown in FIG. 7A, the height of the opening 5 is generally same as that of the image scanner part 3. According to this construction, the information input operation of a thin book can be carried out in a state where the image scanner part 3 is accommodated in the case 2 with the document set thereon.

On the contrary, in the image processing apparatus 1C shown in FIG. 7B, the height of the opening 5A is a larger than that of the image scanner part 3 by a predetermined value (indicated by an arrow H in the figure). By setting the height of the opening 5A larger in this way so that a gap (H) is formed on top of the image scanner part 3, it is possible to carry out the information input operation of a thick document such as a book in a state where the image scanner part 3 is accommodated in the case 2.

Figure 8:
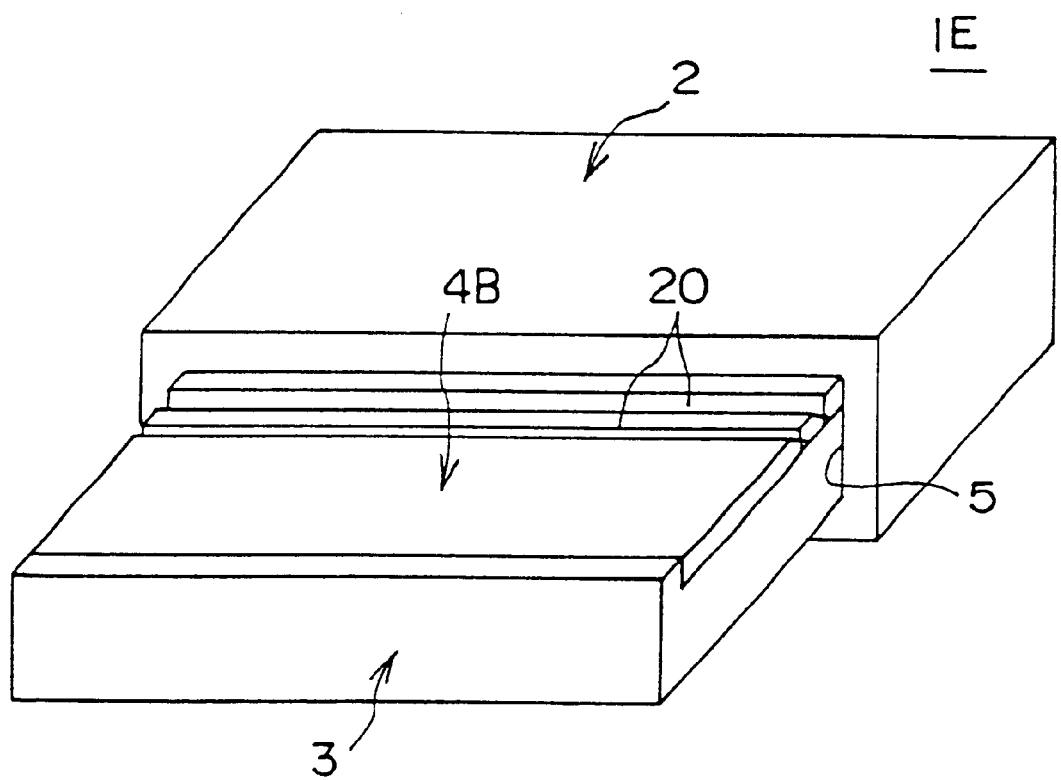
FIG. 8 is a diagram showing an image processing apparatus of a third embodiment of the present invention.
Figure 9A:
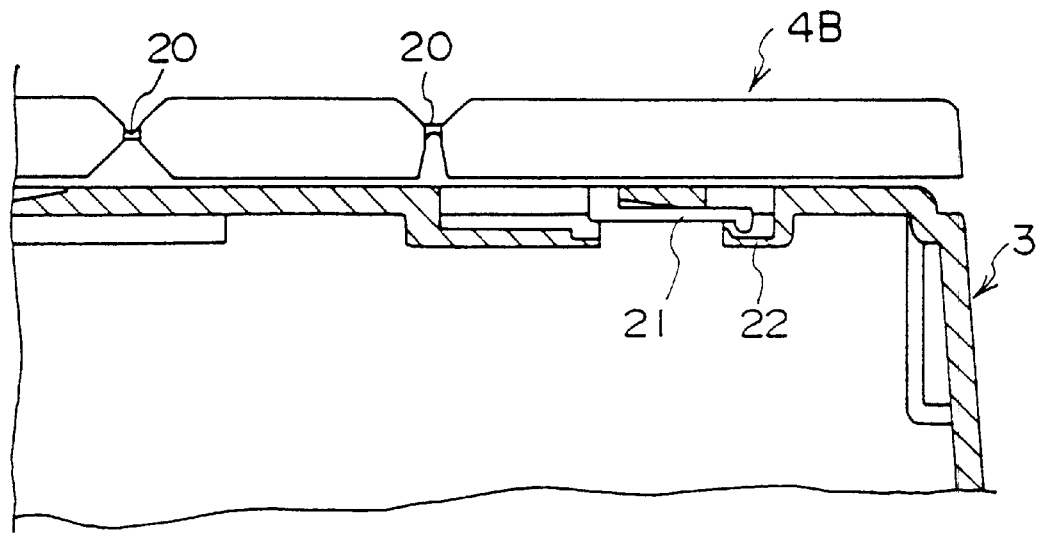
FIGS. 9A and 9B are diagrams showing a document cover provided in the image processing apparatus of the third embodiment of the present invention.
Figure 9B:
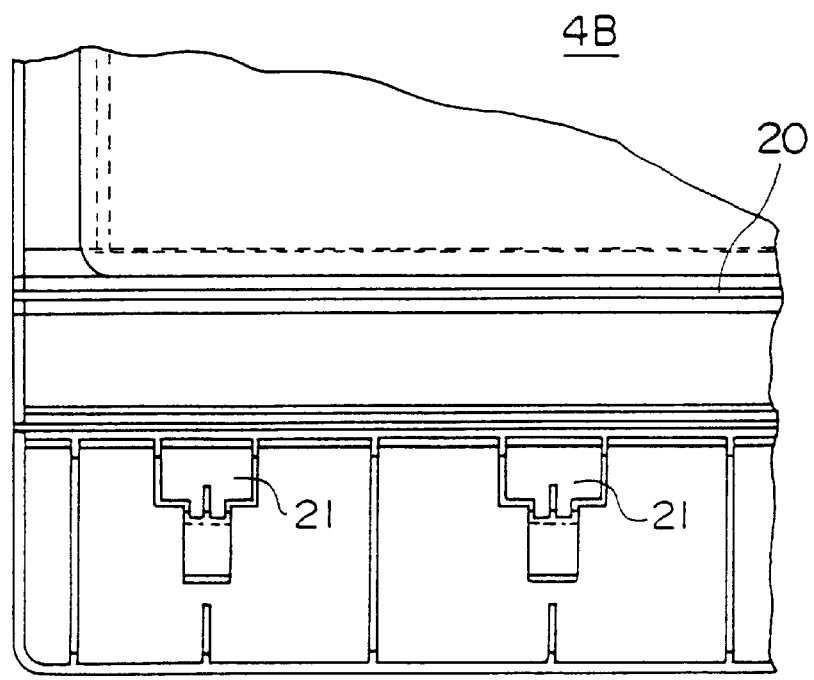

Next, a description will be given of a third embodiment of the present invention. An image processing apparatus 1E of the third embodiment of the present invention is shown in FIGS. 8, 9A, and 9B. FIG. 8 shows the image processing apparatus 1E in a state where the image scanner part 3 is pulled out from the case 2. FIGS. 9A and 9B show an important part of a document cover 4B which is provided on the image processing apparatus 1E.

In the image processing apparatuses according to the first and second embodiments, each of the document covers 4, 4A is formed as a single plate-like member. On the contrary, in the image processing apparatus 1E according to the third embodiment, two or more bending fulcrums 20 are formed in the document cover 4B.

The thickness of the bending fulcrums 20 is smaller than that of other portions of the document cover 4B so that the document cover 4B can be bent along the bending fulcrums 20 (shown in FIG. 9A in detail). Although the thickness of the bending fulcrums 20 is smaller than that of other portions of the document cover 4B, the bending fulcrums 20 have enough strength to withstand bending deformation without causing breakage.

According to the third embodiment where the document cover 4B can be bent with the bending fulcrums formed therein, when the information input operation of a thick document is carried out, the document cover 4B can be bent along the document so that the document is completely covered by the document cover 4B. Thus, it is possible to prevent ambient light from entering the image scanner part 3. It is also possible to bring the document in close contact with the document glass 6 so that the information input operation can be carried out with high quality.

In addition, hook pieces 21 are formed on the document cover 4B as shown in FIGS. 9A and 9B. The hook pieces 21 can be detachably engaged with hook parts 22 formed on the housing of the image scanner part 3. Accordingly, the document cover 4B can be detachably engaged with the image scanner part 3.

As a result, in a case where a document is so thick that the document cover 4B disturbs the information input operation or in a case where it is desired to quickly input information of a plurality of documents, it is possible to carry out the information input operation efficiently by removing the document cover 4B from the image scanner part 3.

Figure 10:
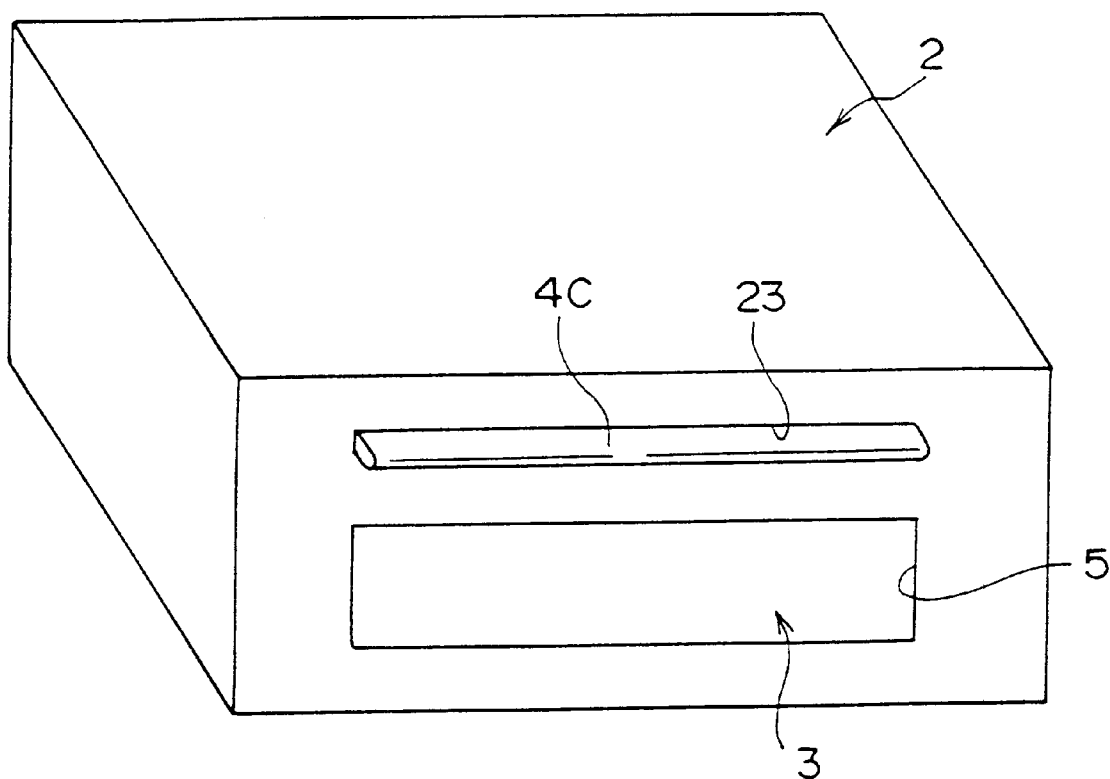
FIG. 10 is a diagram showing an image processing apparatus of a fourth embodiment of the present invention.
Figure 11:
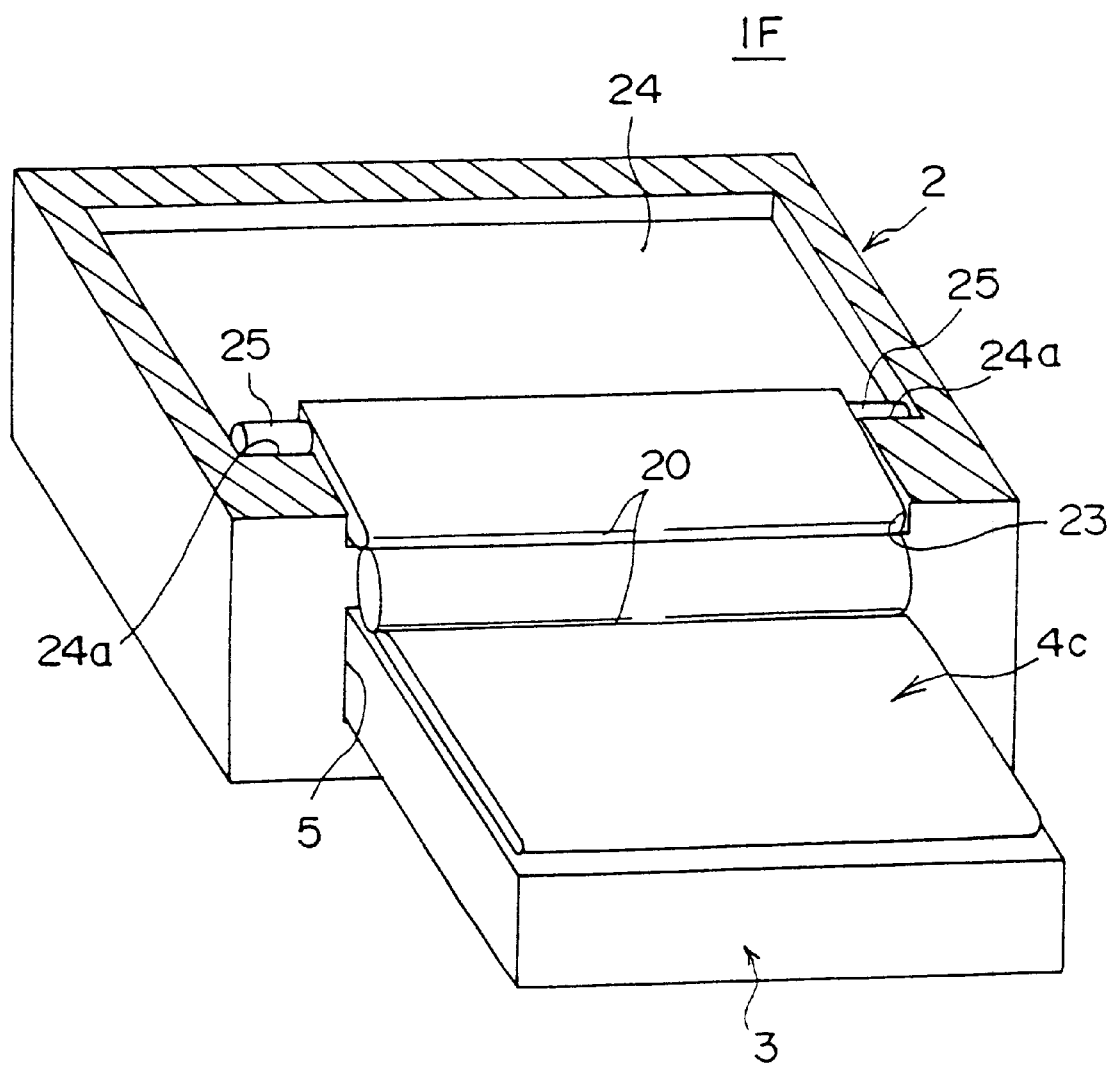
FIG. 11 is a partly cut-out view of the image processing apparatus of the fourth embodiment of the L present invention.

Next, a description will be given of a fourth embodiment of the present invention. An image processing apparatus 1F of the fourth embodiment of the present invention is shown in FIGS. 10 and 11. FIG. 10 shows the image processing apparatus 1F in a state where the image scanner part 3 is accommodated in the case 2, and FIG. 11 is a partly cut-out view of the image processing apparatus 1F in a state where the image scanner part 3 is pulled out from the case 2.

In the first through third embodiments described above, the document covers 4, 4A, and 4B which are provided on the image processing apparatuses 1A–1C, 1E are mounted to the image scanner part 3 so that the document covers 4, 4A, 4B are pulled out and accommodated in the case 2 together with the image scanner part 3.

On the contrary, in the image processing apparatus 1F according to the fourth embodiment, a document cover 4C can be directly pulled out from the case 2. In other words, the document cover 4C is separated from the image scanner part 3 so that the document cover 4C can be pulled out and accommodated in the case 2 independent of whether the image scanner part 3 is pulled out or accommodated in the case 2.

To realize the above construction, a cover accommodating part 24 for accommodating the document cover 4C is formed in the case 2. The document cover 4C can be pulled out from the case 2 through a document cover opening 23 formed on a front side of the cover accommodating part 24. In addition, arms 25 are formed on a back side of the document cover. 4C, which arms project to both sides. Lock parts 24a are formed on both sides of the document cover opening 23, and engage with the arms 25 to limit further movement of the document cover 4 (as shown in FIG. 11 in detail).

If information of a plurality of pages of a thick book is to be input, the document cover 4C may disturb the information input operation because the operator has to push the book against the document glass 6. In such a case, according to the fourth embodiment where the document cover 4C can be pulled out from the case 2, it is possible to carry out the information input operation with the document cover 4C being pulled out or accommodated in case 2 depending on the type of the document. Thus, it is easy to carry out the information input operation in a manner suited to the type of the document. In addition, when the document cover 4C is not used, the document cover 4 does not disturb the information input operation because it is accommodated in the case 2.

Bending fulcrums 20 are formed in the document cover 4C of the fourth embodiment as well. According to the, image processing apparatus 1F in which the document cover 4C can be pulled out from the case 2 as described above, since the image scanner part 3 and the document cover 4C are pulled out from different positions, there arises a step between the image scanner part 3 and the document cover 4C in a state in which the document cover 4C is pulled out. In such a case, according to the fourth embodiment where the document cover 4C can be bent with at least two bending fulcrums formed therein, it is possible to securely bring the document cover 4C in close contact with the image scanner part 3 (see FIG. 11).

Figure 12:
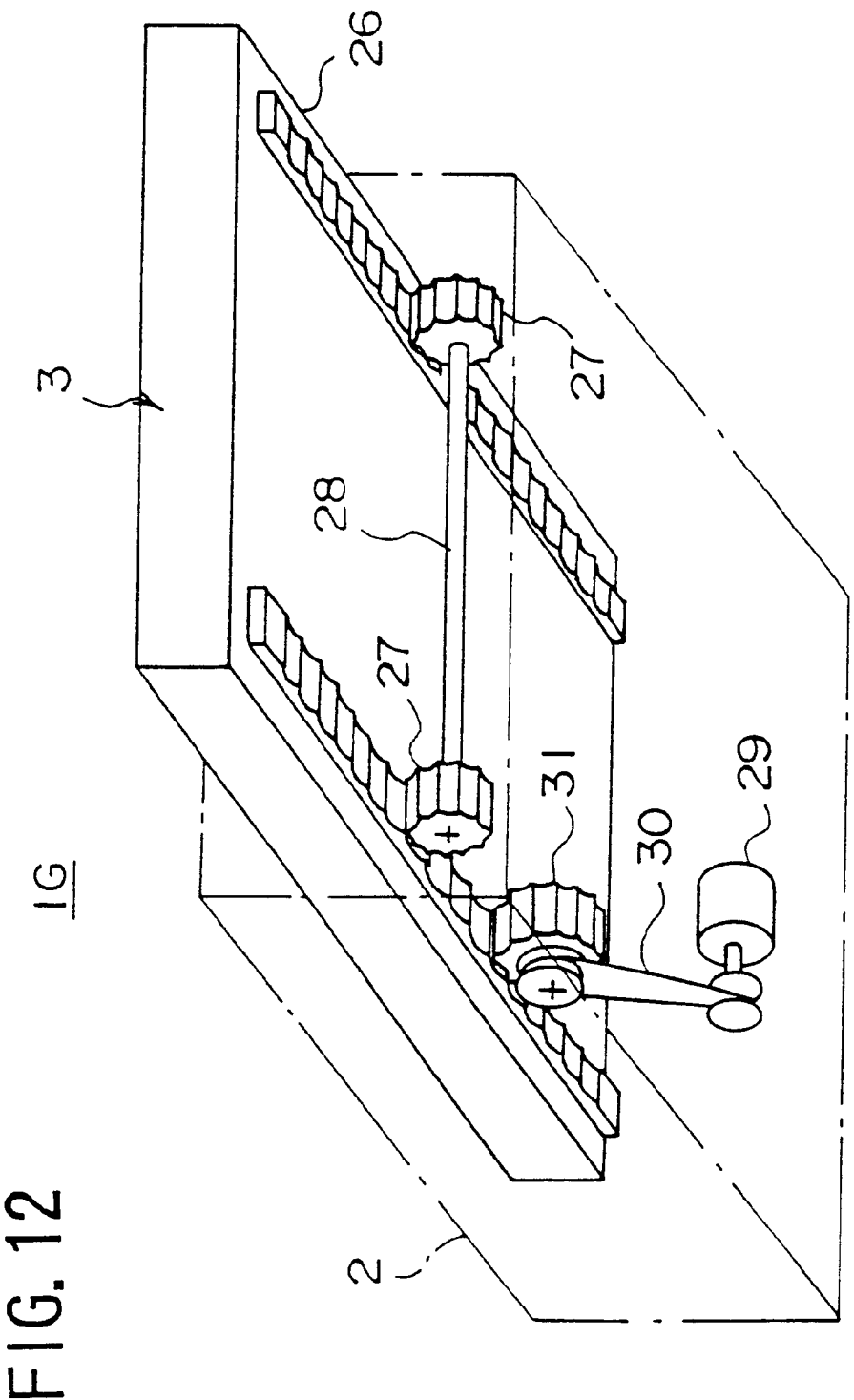
FIG. 12 is a diagram showing an image processing apparatus of a fifth embodiment of the present invention.
Figure 13:
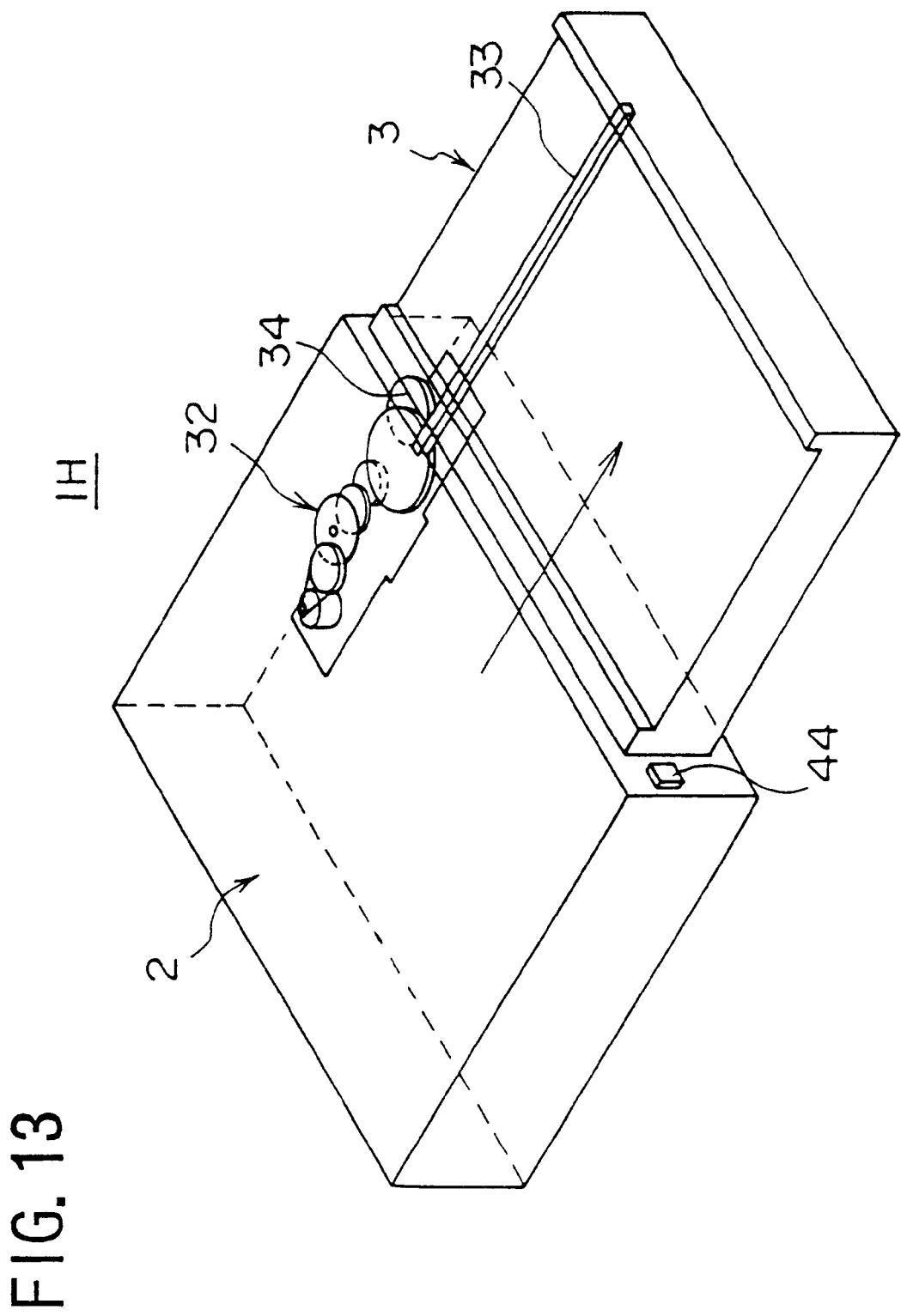
FIG. 13 is a diagram showing an image processing apparatus of a sixth embodiment of the present invention.

Next, a description will given of fifth and sixth embodiments of the present invention. FIG. 12 shows an image processing apparatus 1G according to the fifth embodiment, and FIG. 13 shows an image processing apparatus 1H according to the sixth embodiment. In the fifth and sixth embodiments of the present invention, the image scanner part 3 can be automatically pulled out from and accommodated into the case 2.

In the image processing apparatus 1G shown in FIG. 12, a pair of racks 26 are disposed parallel to each other on a bottom face of the image scanner part 3. One of the racks 26 located on the left in the figure is engaged with a pinion 31. The pinion 31 is in turn connected to a motor 29 via a belt 30. Consequently, when the motor 29 is rotated, the rotation is transferred to the pinion 31 so that the image scanner part 3 can be automatically pulled out from or accommodated into the case 2 in accordance with the direction of the rotation of the motor 29.

In addition, the pair of racks 26 are respectively engaged with a second pair of pinions 27. The pair of pinions 27 are connected to each other by a shaft 28. Accordingly, the pair of pinions 27 rotate as one body and therefore the image scanner part 3 can be moved at in identical speed on both sides thereof. As a result, a stable movement of the image scanner part 3 can be achieved.

In the image processing apparatus 1H shown in FIG. 13, a loading device 32 is disposed in the case 2. An actuation gear 34 which constitutes the loading device 32 is engaged with a rack 33 disposed on the bottom face of the image scanner part 3. In the image processing apparatus 1H shown in FIG. 13, when a switch 44 disposed on the front panel of the case 2 is operated, the loading device 32 is actuated so that the image scanner part 3 is pulled out from or accommodated into the case 2.

According to the above construction in which the image scanner patt 3 can be automatically pulled out from and accommodated into the case 2, the operation for moving the image scanner part 3 can be easily carried out. Alternately, the image scanner part 3 can manually be pulled out and accommodated into the case 2. It is also possible to selectively employ the automatic and manual operations of the image scanner part 3.

Figure 14:
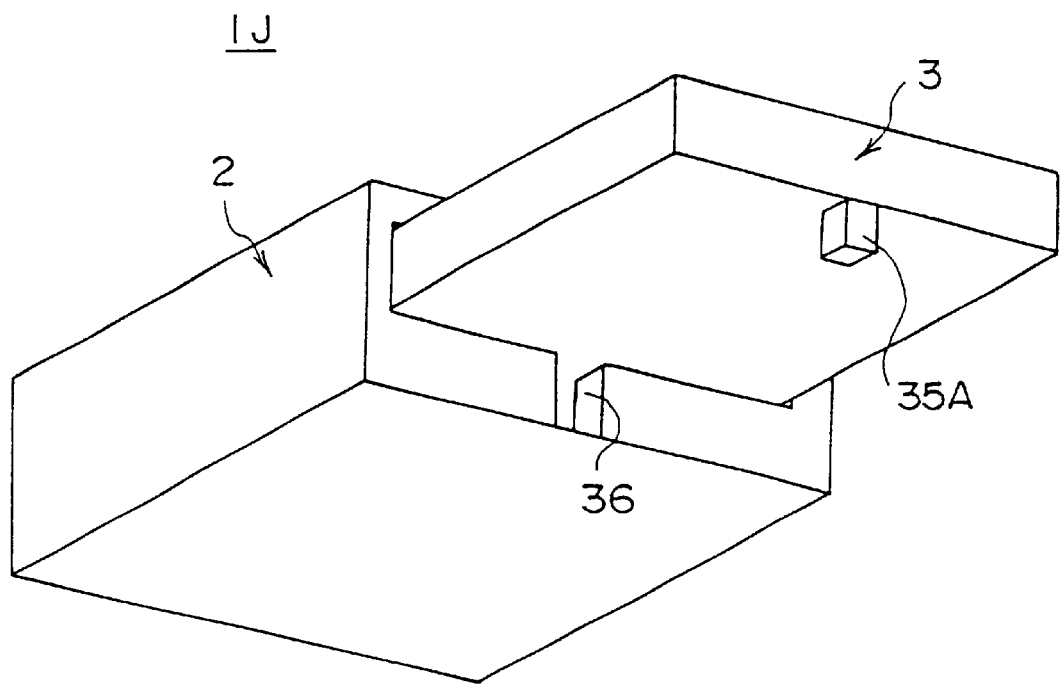
FIG. 14 is a diagram showing an image processing apparatus of a seventh embodiment of the present invention.
Figure 15:
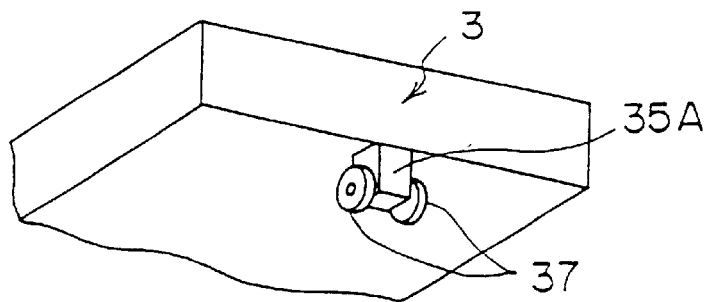
FIG. 15 is a diagram showing a modified example of the image processing apparatus of the seventh embodiment of the present invention.
Figure 16:
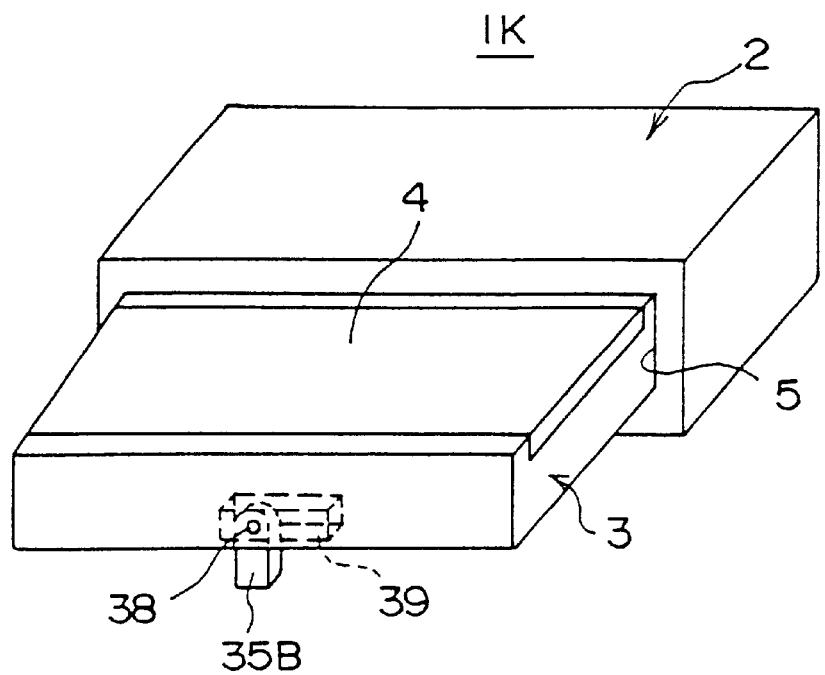
FIG. 16 is a diagram showing an image processing apparatus of an eighth embodiment of the present invention.
Figure 17:
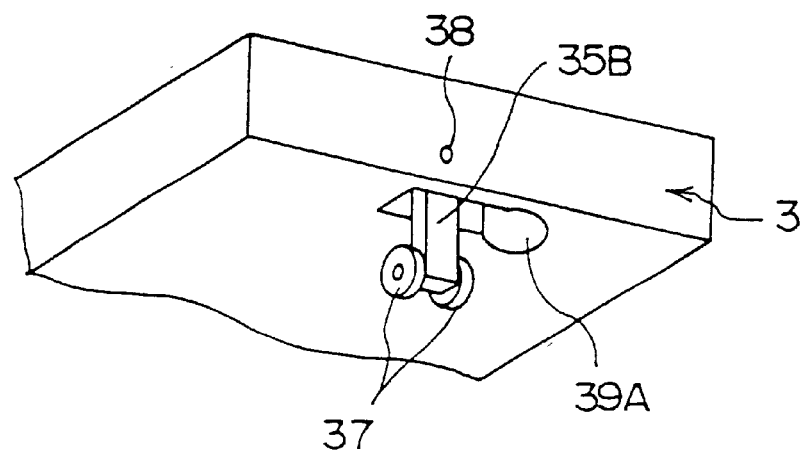
FIG. 17 is a diagram showing a modified example of the image processing apparatus of the eighth embodiment of the present invention.
Figure 18:
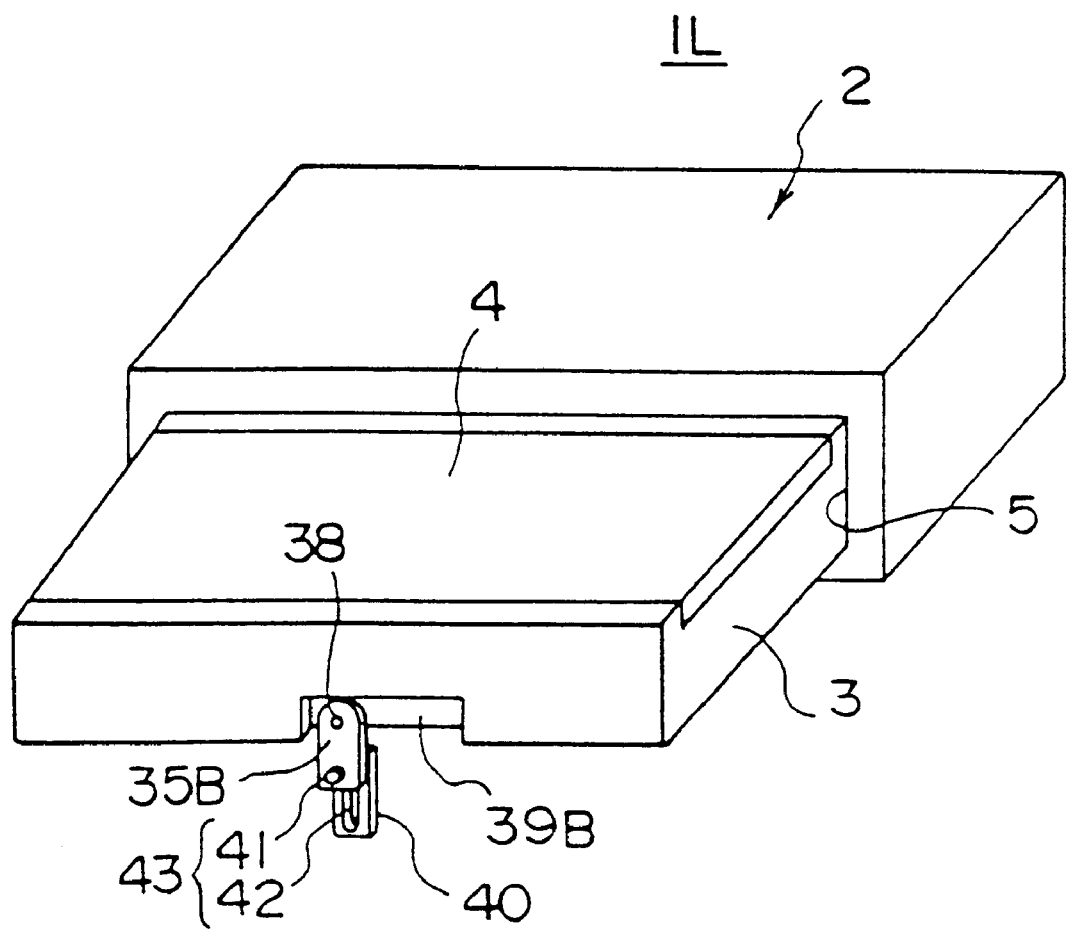
FIG. 18 is a diagram showing an image processing apparatus of a ninth embodiment of the present invention.
Figure 19A:
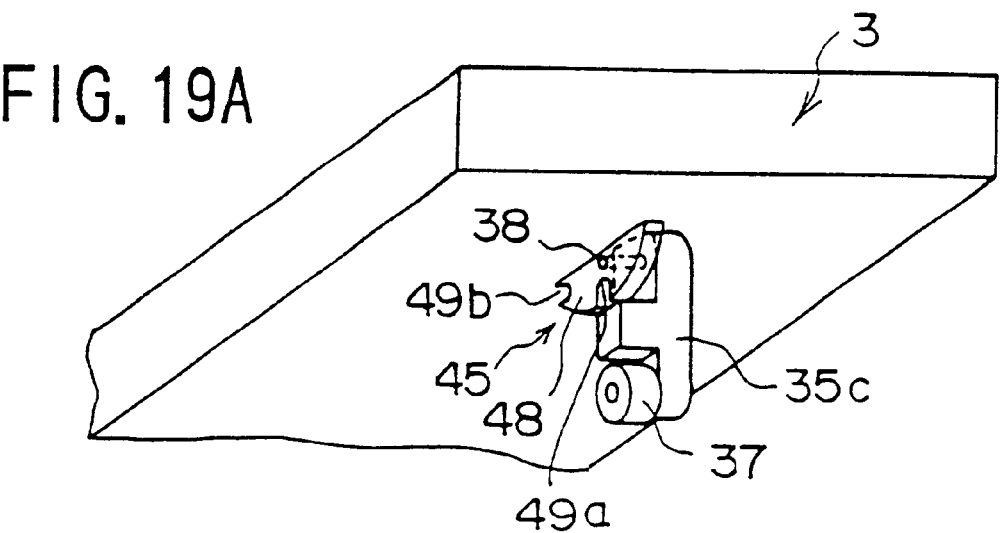
FIG. 19A is a diagram showing a bottom face of an image scanner part of an image processing apparatus of a tenth embodiment of the present invention.
Figure 19B:
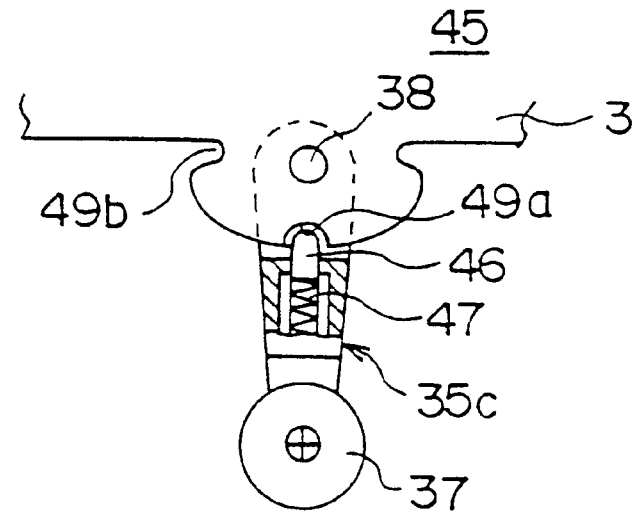
FIGS. 19B and 19C are diagrams showing movement of a clamp mechanism.
Figure 19C:
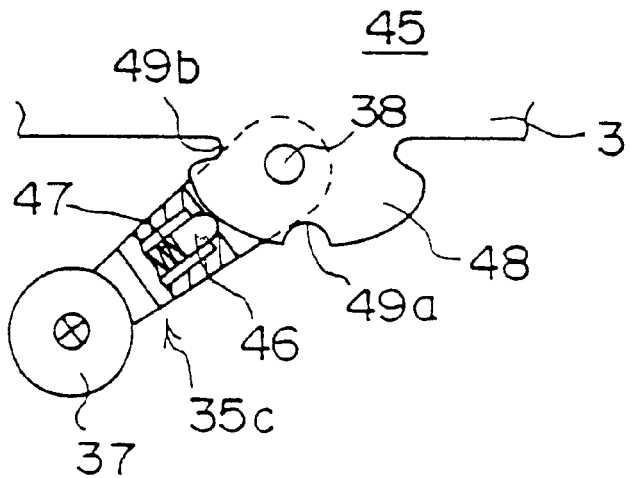

Next, a description will be given of seventh through tenth embodiments of the present invention. FIG. 14 shows an image processing apparatus 1J of the seventh embodiment of the present invention, and FIG. 15 shows a modification of the seventh embodiment. FIG. 16 shows an image processing apparatus 1K of the eighth embodiment of the present invention, and FIG. 17 shows a modification of the eighth embodiment. FIG. 18 shows an image processing apparatus 1L of the ninth embodiment of the present invention, and FIGS. 19A, 19B, and 19C show an image processing apparatus of the tenth embodiment of the present invention.

As has been described previously, the image scanner part 3 is apt to fall forward because the image scanner part 3 is pulled out forward from the case 2 in the image processing apparatus according to the present invention. In the first embodiment described above, in order to prevent the image scanner part 3 from falling forward, heavy-weight devices and components are disposed collectively in the back side of the image processing apparatus with respect to the direction in which the image scanner part 3 is pulled out so that the center of gravity of the apparatus is positioned in the back side thereof.

However, in a case, for example, where the information input operation is carried out with a heavy and thick book having been placed on the image scanner part 3 which is pulled out, it may be not enough to shift the center of gravity backward for preventing the image scanner part 3 from falling forward. In the seventh through tenth embodiments, support legs 35A–35C are provided on a bottom face of the image scanner part 3 so that the image scanner part 3 is prevented from falling forward.

In the image processing apparatus 1J of the seventh embodiment of the present invention shown in FIG. 14, a pillar-shaped support leg 35A projects downward from the bottom face of the image scanner part 3. An accommodating slot 36 is formed on the underside of the opening 5 at a position corresponding to the support leg 35A. When the image scanner part 3 is accommodated into the case 2, the support leg 35A is accommodated in the accommodating slot 36.

In addition, in a state in which the image scanner part 3 is pulled out from the case 2, the support leg 35A abuts against a base (a desk, for example) on which the image processing apparatus 1J is placed and functions to support the image scanner part 3 on the base. Accordingly, when the information input operation is carried out with a heavy and thick book having been placed on the image scanner part 3, the image scanner part 3 is supported on the base by the support leg 35A and is thus prevented from falling forward.

In the modification of the seventh embodiment shown in FIG. 15, a roller 37 is disposed at the end of the support leg 35A. By providing the roller 37 in this way, the image scanner part 3 can be smoothly pulled out from and accommodated into the case 2 with the roller 37 rolling on the base. In addition, the roller 37 rotates on the base when the image scanner part 3 is moved so that the base can be prevented from being damaged.

In the image processing apparatus 1K of the eighth embodiment of the present invention shown in FIG. 16, a pillar-shaped support leg 35B is disposed on the bottom face of the image scanner part 3 pivotably about a fulcrum point 38, and an accommodating recess 39 for accommodating the support leg 35B is formed on said bottom face.

The above construction realizes a mode where the support leg 35B projects downward from the bottom face of the image scanner part 3 and another mode where the support leg 35B is accommodated in the accommodating recess 39. Therefore, when the information input operation is carried out with a heavy and thick book having been placed on the image scanner part 3, it is possible to prevent the image scanner part 3 from falling forward by pulling out the support leg 35B from the accommodating recess 39 and selecting the mode where the support leg 35B projects downward from the bottom face of the image scanner part 3. When a light-weight document is placed on the image scanner part 3, the information input operation may be carried out in the mode where the support leg 35B is accommodated in the accommodating recess 39.

Consequently, according to the image processing apparatus 1K of the eighth embodiment, it is possible to securely prevent the image scanner part 3 from falling forward even when the information input operation of a heavy document is carried out, and it is also possible to prevent the support leg 35B from being an obstacle when the image scanner part 3 is accommodated into the case 2. In addition, it is possible to miniaturize the apparatus because there is no need to provide an accommodating recess on the opening 5.

In the modification of the eighth embodiment shown in FIG. 17, a roller 37 is provided at the end of the support leg 35B. According to this construction, the image scanner part 3 can be smoothly pulled out from and accommodated into the case 2, and it is also possible to prevent the base from being damaged.

In the image processing apparatus 1L of the ninth embodiment of the present invention shown in FIG. 18, a pillar-shaped support leg 35B is disposed on the bottom face of the image scanner part 3 pivotably about a fulcrum point 38 and an accommodating recess 39B for accommodating the support leg 35B is formed on said bottom face, just as in the eighth embodiment described above. In addition, in the image processing apparatus 1L according to the ninth embodiment, a length adjustment mechanism 43 is provided for adjusting the length of the support leg 35B.

The length adjustment mechanism 43 is generally composed of a second support leg 40, a screw 41, and a nut (not shown) screwed on the screw 41 behind the second leg 40. The second support leg 40 has an elongated hole 42 formed therein, which hole extends in a vertical direction in the figure. The screw 41 is rotably disposed on the support leg 35B and projects to the back of the second support leg 40 through the elongated hole 42 formed in the second support leg 40. The nut is screwed on the portion of the screw 41 projecting from the back side of the second support leg 40.

According to the construction described above, when the screw 41 is loosen, it is possible to expand and retract the second support leg 40 with respect to the support leg 35B. The second support leg 40 can be fixed to the support leg 35B at a desired length thereof by tightening the screw 41 and the nut.

Consequently, in a case where the base is uneven and there is a difference in height between the positions of the base where the case 2 is placed and where the support leg 35B is positioned, it is possible to assure that the support legs 35B and 40 come into contact with the base by adjusting the length of the support legs 35B and 40. As a result, it is possible to prevent the image scanner part 3 from falling forward regardless of the form and condition of the base. Of course, a roller may be provided at the end of the support leg 40 in the ninth embodiment as well, although it is not shown in the figure.

In the image processing apparatus of the tenth embodiment of the present invention shown in FIGS. 19A, 19B, and 19C, a support leg 35C is disposed on the bottom face of the image scanner part 3 pivotably about the fulcrum point 38 (in a direction in which the image scanner part 3 is pulled out and accommodated in the case 2). A clamp mechanism 45 is provided for clamping the support leg 35C in a support position where it supports the image scanner part 3 and in an accommodating position where it is set when the image scanner part 3 is accommodated in the case 2.

The clamp mechanism 45 comprises a clamp pin 46, a spring 47, and a cam part 48. The clamp pin 46 and the spring 47 are disposed inside the support leg 35C. The clamp pin 46 is biased against the cam part 48 by a resilient force of the spring 47. The cam 48 has a generally semicircular shape with a clamp slot 49a formed on its bottom and a clamp slot 49b formed on its side.

When the support leg 35C pivots on the fulcrum point 38, the clamp pin 46 slides on the circumferential face of the cam part 48. In a position where the clamp pin 46 faces the clamp slots 49a and 49b, the clamp pin 46 biased by the spring 47 goes into and is engaged with the clamp slots 49a and 49b respectively to prevent the rotation of the support leg 35C.

When the clamp pin 46 is engaged with the clamp slot 49a, the support leg 35C is clamped in a position (support position) where it projects downward in a vertical direction from the bottom face of the image scanner part 3 (as shown in FIGS. 19A and 19B). When the clamp pin 46 is engaged with the clamp slot 49b, the support leg 35C is clamped in a position (accommodating position) where it lies along the bottom face of the image scanner part 3 so that the movement thereof is not obstructed.

By exerting a strong force in a direction of rotation on the support leg 35C in the state where the clamp pin 46 is engaged with the clamp slot 49a or 49b, it is possible to release the engagement. In the state where the clamp pin 46 is disengaged from the clamp slots 49a and 49b (as shown in FIG. 19C), the support leg 35C can freely rotate again.

According to the construction described above, when the support leg 35C is clamped in its support position, it is possible to prevent the support leg 35C from rotating unexpectedly and therefore the image scanner part 3 is securely prevented from falling forward. In addition, it is possible to prevent the support leg 35C from obstructing the accommodation of the image scanner part 3 by clamping the support leg 35C in its accommodating position.

Figure 20A:
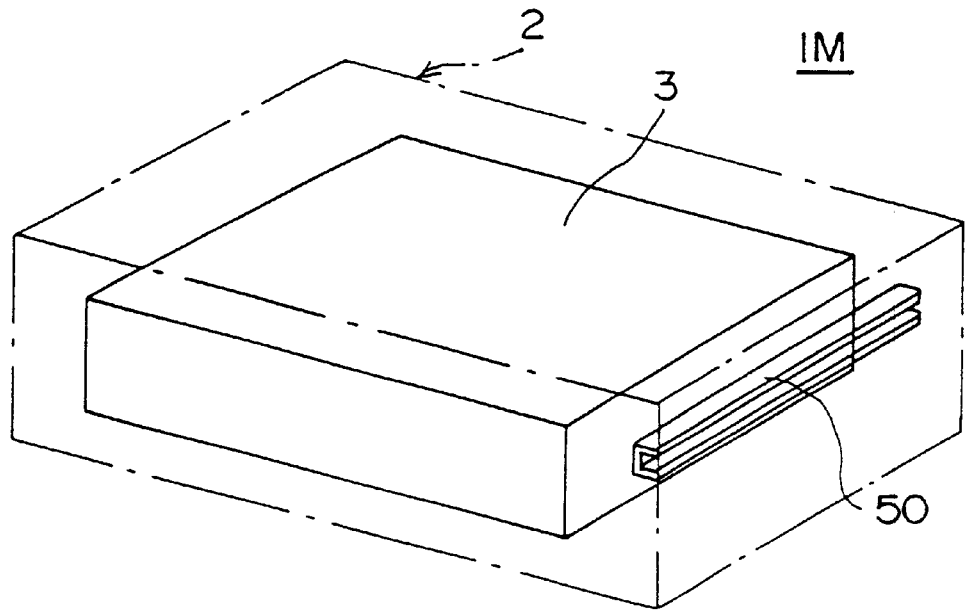
FIG. 20A is a diagram showing rail parts of an image processing apparatus of an eleven embodiment of the present invention.
Figure 20B:
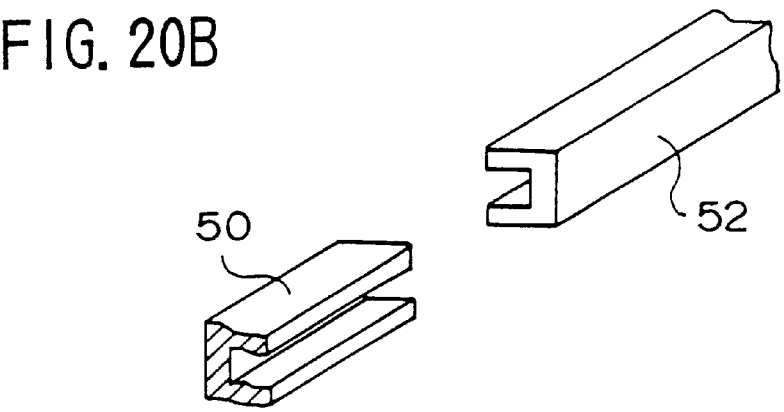
FIGS. 20B and 20C are diagrams illustrating engagement of a rail and a frame.
Figure 20C:
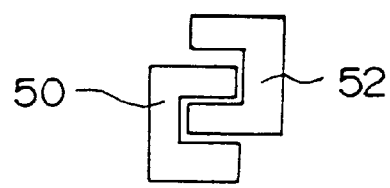
Figure 21A:
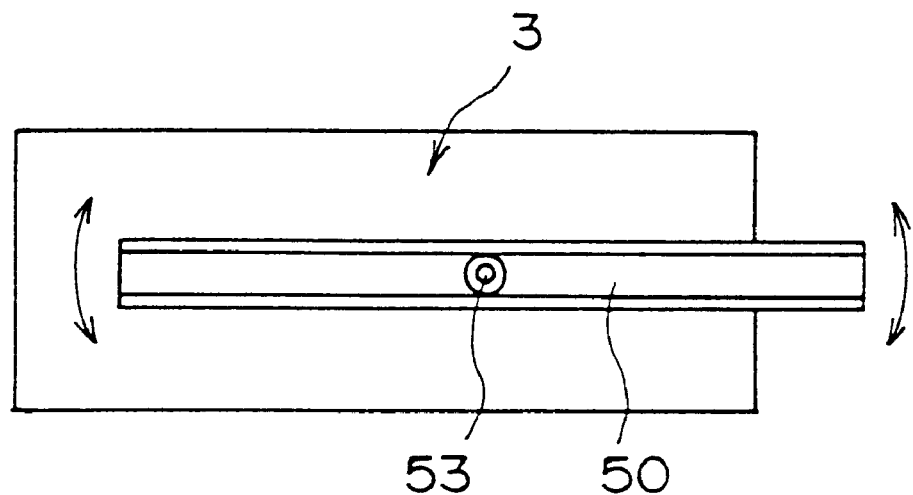
FIGS. 21A and 21B are sideviews of an image scanner part of the image processing apparatus of the eleventh embodiment of the present invention seen from the right and the left, respectively.
Figure 21B:
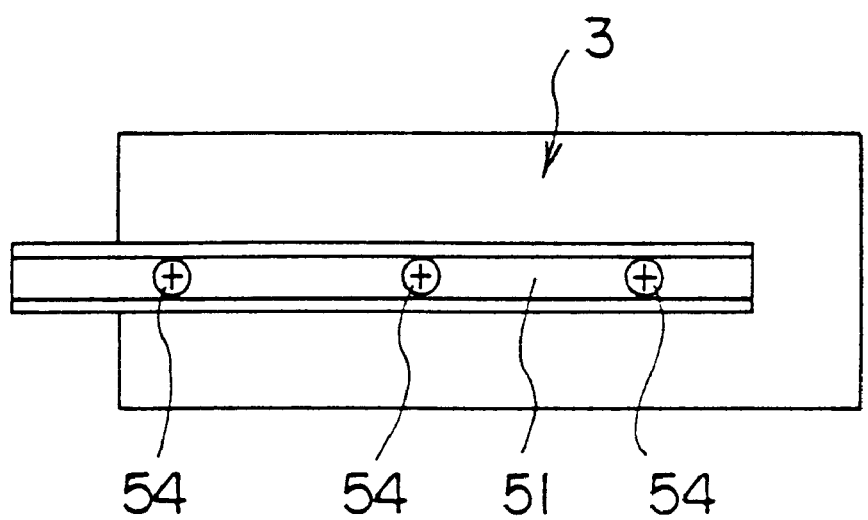

Next, a description will be given of an eleventh embodiment of the present invention. FIGS. 20A, 20B, 20C, 21A, and 21B show an image processing apparatus 1M of the eleventh embodiment of the present invention. FIG. 20A, 20B, and 20C are diagrams showing a construction of the image processing apparatus 1M in which the image scanner part 3 is movably guided inside the case 2. FIGS. 21A and 21B are sideviews of the image scanner part 3 seen from the right and the left, respectively.

In the image processing apparatus 1M according to the eleventh embodiment of the present invention, a pair of guide frames 52 are provided for guiding the movement of the image scanner part 3. The guide frames 52 are disposed inside the case 2 on both sides thereof at positions facing the image scanner part 3. On both sides of the image scanner part 3, a pair of rail parts 50 and 51 are disposed for engaging with the guide frames 52.

As shown in FIG. 20B, the guide frames 52 and the rail parts 50 and 51 have substantially U-shaped cross sections. As shown in FIG. 20C, the guide frames 52 are engaged with the rail parts 50 and 51 to confine the movement thereof so that the image scanner part 3 is movably guided inside the case 2.

As described above, by providing the guide frames 52 inside the case 2 for guiding the movement of the image scanner part 3 and by disposing a pair of rail parts 50 and 51 on both sides of the image scanner part 3 for engaging with the guide frames 52, the image scanner part 3 can be smoothly pulled out from and accommodated into the case 2 guided by the guide frames 52. Next, a description will be given of structures which mount the rail parts 50 and 51 to the image scanner part 3 with reference to FIGS. 21A and 21B. FIG. 21A shows a mount structure for the right rail 50. As shown in FIG. 21A, the right rail 50 is mounted to the image scanner part 3 by only a support fulcrum 53 so that the right rail 50 can pivot on the fulcrum 53 (in a direction indicated by arrows shown in FIG. 21A).

FIG. 21B shows a mount structure for the left rail 51. As shown in FIG. 21B, the left rail 51 is fixed to the image scanner part 3 by a plurality of fixing screws 54. Accordingly, contrary to the right rail 50, the left rail 51 cannot pivot.

The case 2 is not always placed on a flat surface of a base (a desk, for example). If the case 2 is place on a surface which is not flat and the structure that allows the image scanner part 3 to be pulled out from the case 2 has low rigidity, a load may be applied to the sliding part of the image scanner part 3 (that is, the part where the guide frames 52 are engaged with the rail parts 50 and 51). In this case, various problems may arise such as misalignment of the guide frames 52 and rail parts 50 and 51, increase of sliding resistance between the guide frames 52 and rail parts 50 and 51, and distortion of the guide frames 52 or the rail parts 50 and 51. In addition, the operation of the scanner head 7 disposed inside the image scanner part 3 may be disturbed. Further, the relative position of the scanner head 7 and the document glass 6 may be changed to degrade the quality of read images.

However, according to the image processing apparatus 1M of the eleventh embodiment of the present invention, the rail part 50 which is movably disposed with respect to the image scanner part 3 functions as a buffer between the case 2 and the image scanner part 3 and therefore the above problems can be avoided.

The present invention is not limited to these embodiments, but various variations and modifications may be made without departing from the: scope of the present invention.

What is claimed is:

1. An image processing apparatus comprising:

a box-shaped case having an opening; and an image scanner part of a flat bed type which carries out an information input operation and is disposed in said opening so that said image scanner part can be pulled out therefrom, wherein an optical component of said image scanning part, which is supported by an actuation device and a guide shaft collectively disposed on a back side thereof with respect to said opening moves perpendicularly with respect to a direction in which said image scanner part is pulled outwardly from said box-shaped case, wherein an object can be placed on top of said image processing apparatus, and a medium can be placed in said opening which is to be read when the image scanner part is pulled out.

2. The image processing apparatus as claimed in claim 1, wherein said image scanner part performs said information input operation in a state in which said image scanner part is accommodated in said opening.

3. The image processing apparatus as claimed in claim 1, further comprising a document cover for covering a document on which information to be input is recorded.

4. The image processing apparatus as claimed in claim 3, wherein said document cover is disposed on said image scanner part.

5. The image processing apparatus as claimed in claim 4, wherein said opening has a height greater than a height of said image scanner part so that a gap is formed on top of said image scanner part.

6. The image processing apparatus as claimed in claim 3, wherein said document cover is disposed in said box-shaped case so that said document cover can be pulled out therefrom.

7. The image processing apparatus as claimed in claim 3, further comprising at least two bending fulcrums formed in said document cover.

8. The image processing apparatus as claimed in claim 6, further comprising at least two bending fulcrums formed in said document cover.

9. The image processing apparatus as claimed in claim 1, wherein heavier devices said image scanner part are collectively disposed in a back side thereof with respect to a direction in which said image scanner part is pulled out.

10. The image processing apparatus as claimed in claim 1, wherein heavier devices in said box-shaped case are collectively disposed in a back side thereof with respect to a direction in which said image scanner part is pulled out.

11. The image processing apparatus as claimed in claim 1, further comprising a support leg for supporting said image scanner part so that said image scanner part is prevented from falling forward in a state in which image scanner part is pulled out.

12. The image processing apparatus as claimed in claim 11, further comprising a rolle[00f8] provided at the end of said support leg.

13. The image processing apparatus as claimed in claim 11, wherein said support leg can be accommodated in said image scanner part.

14. The image processing apparatus as claimed in claim 11, further comprising a length adjustment mechanism for adjusting a length of said support leg.

15. The image processing apparatus as claimed in claim 13, further comprising a clamp mechanism for clamping said support leg at least in a support position where said support leg supports said image scanner part and in an accommodation position where said support leg is positioned when said image scanner part is accommodated in said box-shaped case.

16. The image processing apparatus as claimed in claim 1, further comprising:

guide frames provided inside said box-shaped case for guiding movement of said image scanner part; and a pair of rail parts disposed on both sides of said image scanner part for engaging said guide frames, one of said pair of rail parts being rotatable with respect to said image scanner part.

17. An image processing apparatus comprising:

a box-shaped case having an opening;

an image scanner part of a flat bed type which carries out an information input operation and is disposed in said opening so that said image scanner part can be pulled out therefrom; and a support leg for supporting said image scanner part so that said image part is prevented from falling forward in a state in which image scanner part is pulled out, wherein an optical component of said image scanning part, which is supported by an actuation device and a guide shaft collectively disposed on a back side thereof with respect to said opening, moves perpendicularly with respect to a direction in which said image scanner part is pulled outwardly from said box-shaped case, wherein an object can be placed on top of said image processing apparatus, and a medium can be placed in said opening which is to be read when the image scanner part is pulled out.

18. The image processing apparatus as claimed in claim 17, further comprising a roller provided at the end of said support leg.

19. The image processing apparatus as claimed in claim 17, wherein said support leg can be accommodated in said image scanner part.

20. The image processing apparatus as claimed in claim 17, further comprising a length adjustment mechanism for adjusting a length of said support leg.

21. The image processing apparatus as claimed in claim 19, further comprising a clamp mechanism for clamping said support leg at least in a support position where said support leg supports said image scanner part and in an accommodation position where said support leg is positioned when said image scanner part is accommodated in said box-shaped case.

* * * * *